United States Patent [19]

Ide et al.

[11] Patent Number: 4,668,899

[45] Date of Patent: May 26, 1987

[54] OVERHEAD GARAGE DOOR LOCK FOR USE WITH AUTOMATIC OPENER

[75] Inventors: Allan R. Ide, 4020 Elm St. Apt. A, Long Beach, Calif. 90807; William R. Parks, Whittier; Peter S. Arnold, Covina, both of Calif.

[73] Assignee: Allan R. Ide, Long Beach, Calif.

[21] Appl. No.: 796,546

[22] Filed: Nov. 8, 1985

[51] Int. Cl.⁴ .......................... E05B 47/00; H02P 1/40

[52] U.S. Cl. .................................... 318/280; 318/286; 318/16; 70/278; 70/280; 340/825.72

[58] Field of Search ................. 49/139, 197, 198, 199; 70/275, 276, 277, 278, 279, 280; 105/395; 318/280, 286, 445, 446, 466, 467, 468, 16; 340/825.71, 825.72

[56] References Cited

U.S. PATENT DOCUMENTS

| | | | |
|---|---|---|---|
| 1,647,225 | 11/1927 | Hicks | 105/395 |
| 1,768,224 | 6/1930 | Welsch | 105/395 |
| 1,797,384 | 3/1931 | Ward et al. | 70/282 |
| 1,920,868 | 8/1933 | Kirk | 16/49 |
| 2,049,875 | 8/1936 | Singleton | 70/278 X |
| 2,058,414 | 10/1936 | Casse | 70/14 |
| 2,143,439 | 1/1939 | Friend | 49/203 |
| 2,181,313 | 11/1939 | Blodgett | 70/150 |
| 2,753,020 | 7/1956 | Ware, Jr. | 49/318 |
| 2,912,237 | 11/1959 | Snyder | 49/199 |
| 3,308,580 | 3/1967 | Ogilvie | 49/206 |
| 3,319,303 | 5/1967 | Salvo | 49/199 |
| 3,349,516 | 10/1967 | Armstrong | 49/25 |
| 3,366,855 | 1/1968 | Huber et al. | 318/16 |
| 3,591,981 | 7/1971 | Law | 49/139 |
| 3,797,171 | 3/1974 | Farmer | 49/360 |
| 3,831,175 | 8/1974 | Mazalas | 340/825.72 |
| 3,854,310 | 12/1974 | Paull et al. | 70/279 X |
| 3,858,116 | 12/1974 | Friedl et al. | 318/16 X |
| 4,045,715 | 8/1977 | Umpleby et al. | 318/466 X |
| 4,094,158 | 6/1978 | LeVere et al. | 405/303 |
| 4,142,137 | 2/1979 | Umpleby et al. | 318/16 X |
| 4,167,833 | 9/1979 | Farina et al. | 49/199 |
| 4,247,806 | 1/1981 | Mercier | 318/469 X |
| 4,344,252 | 8/1982 | Suzuki et al. | 49/199 |
| 4,463,292 | 7/1981 | Engelmann | 318/467 X |

FOREIGN PATENT DOCUMENTS

| | | | |
|---|---|---|---|
| 0330555 | 8/1919 | Fed. Rep. of Germany | 105/395 |
| 1960550 | 6/1971 | Fed. Rep. of Germany | 49/199 |
| 1390760 | 4/1975 | United Kingdom | 70/278 |

*Primary Examiner*—William M. Shoop, Jr.
*Assistant Examiner*—Bentsu Ro
*Attorney, Agent, or Firm*—Fulwider, Patton, Rieber, Lee & Utecht

[57] ABSTRACT

A garage door locking mechanism incorporating a reversible motor mounted centrally on an overhead garage door and coupled with oppositely disposed rotary latches which are selectively rotated to lock the door in its closed position.

9 Claims, 8 Drawing Figures

OVERHEAD GARAGE DOOR LOCK FOR USE WITH AUTOMATIC OPENER

BACKGROUND OF THE INVENTION

1. Field of the Invention

The automatic garage door locking apparatus of the present invention relates to a mechanism mountable o an overhead garage door driven by an automatic opener to selectively lock the door in its closed position.

2. Description of the Prior Art

In recent times automatic garage door openers have gained great popularity, particularly in the area of residential use. Such garage door openers typically incorporate an overhead chain or similar drive for driving the door to its closed position in response to actuation of a control button or receipt of a signal from a remote location. Such devices typically leave the garage in a relatively insecure state since the closing mechanism, when inoperative, can easily be overcome to force the garage door to its open position. For many such mechanisms, the garage door can simply be driven open by manually applying force thereto having a magnitude well less than one hundred pounds. Since such a force may easily be generated by simply inserting a pry bar or jack under the bottom edge of the door, the residence attached to the garage is left relatively unsecured, particularly if the inhabitants are in the practice of leaving the door joining the attached residence unlocked.

Manual garage door locks have been proposed which incorporate a keeper manually actuable to lock the door in its closed position. A device of this type is shown in U.S. Pat. No. 2,181,313. While satisfactory for its intended purpose, such locking mechanisms are not readily adaptable for use with garage doors incorporating automatic openers and would not provide the convenience of automatic operation upon actuation from a remote location.

Since there are millions of overhead garage doors currently installed in residential and commercial buildings throughout the country, many of which incorporate automatic openers, there exists a need for a garage door locking mechanism which can easily be manufactured and shipped to retail outlets for sale to homeowners and the like for installation on garage doors already built and installed. It is important that the disassembled mechanism be relatively compact for shipping purposes but yet be of such a construction as to be easily installed by a relatively unskilled homeowner without the special training, tools or jigs. To be practical, it is important that the locking mechanism incorporate an electric motor to enable actuation of an electrical circuit from a remote position such that operation of the mechanism can be easily and conveniently initiated by a transmitter carried in the automobile for actuation from a remote location to initiate unlocking of the door prior to operation of the garage door operator. It is these needs which are satisfied by the locking mechanism of the present invention.

SUMMARY OF THE INVENTION

The garage door lock of the present invention is characterized by an electric motor mountable centrally on an overhead garage door to drive a reel over which is trained a belt to rotate a sheave located at the door's edge. Mounted on the sheave is a keeper arm which rotates with the sheave from a retracted position to an extended position projecting beyond the door's edge such that when the garage door is opened it will be carried through a predetermined path to encounter the frame and restrict opening of the door.

An electronic control circuit is provided which permits manual or remote control to open, close, lock, and unlock the garage door by selectively actuating the electric motor rotating the keeper arm to lock and unlock and actuate the garage door to open or close. In the preferred embodiment a lock out switch is incorporated for engagement by the keeper arm when in its projected position to deactivate the garage door opener circuit to positively prevent inadvertent opening of the garage door while the locking mechanism is locked. For increased security, the user must activate the remote control switch a second time within a preset time period to unlock and open the door.

Other objects and features of the invention will become apparent from consideration of the following description taken in connection with the accompanying drawing.

DESCRIPTION OF THE PREFERRED EMBODIMENT

Figure 1:
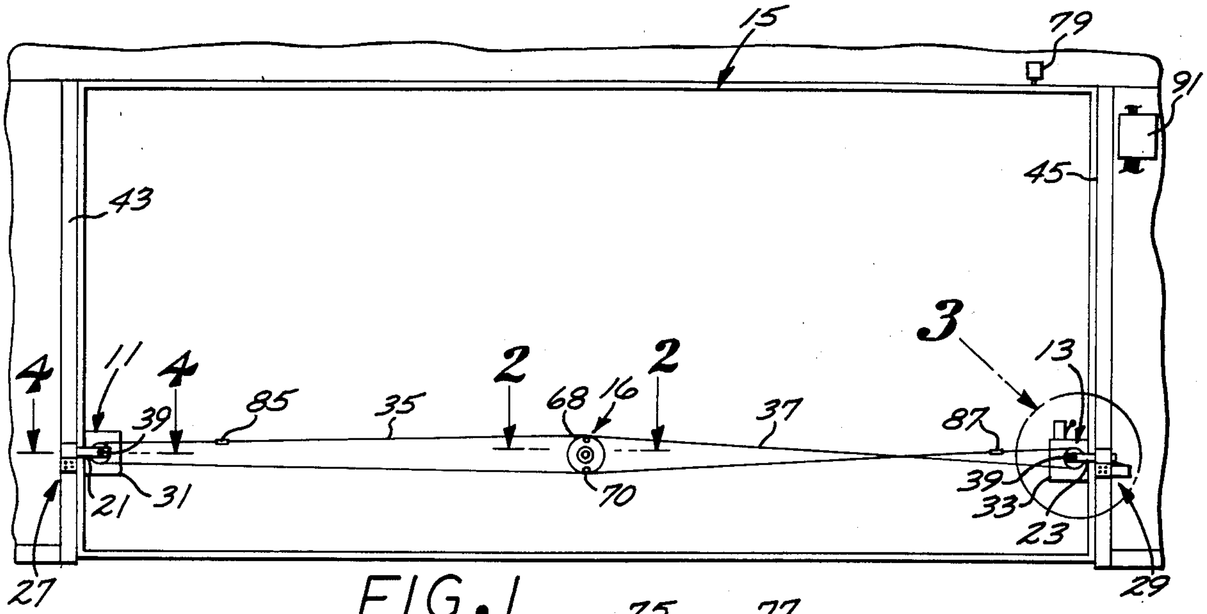
FIG. 1 is an elevational view showing a garage door with the locking mechanism of the present invention installed thereon.
Figure 2:
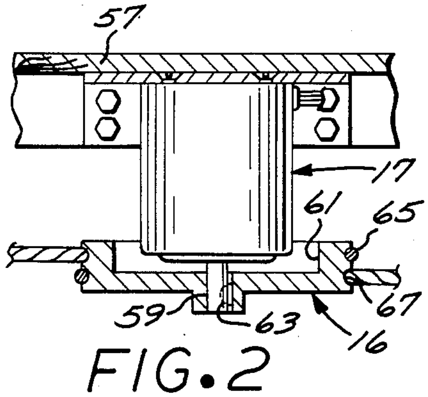
FIG. 2 is a horizontal sectional view, in enlarged scale, taken along the line 2—2 of FIG. 1.
Figure 3:
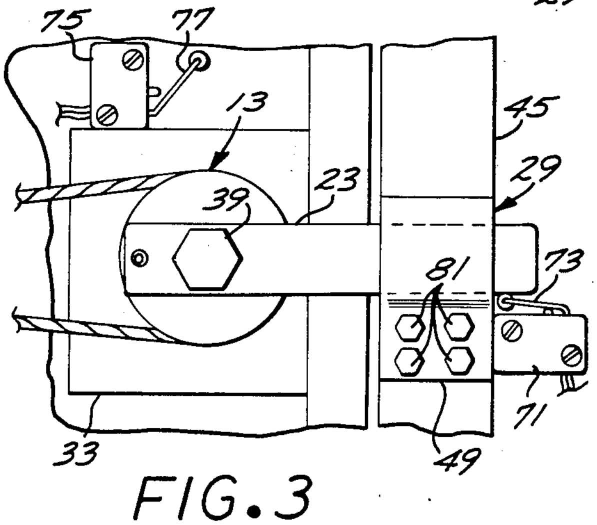
FIG. 3 is a detail view, in enlarged scale, taken from the circle designated 3 in FIG. 1.

Referring to FIGS. 1, 2 and 3, the garage door locking mechanism of the present invention includes, generally, a pair of sheaves 11 and 13 mounted on the opposite sides of a rigid overhead garage door 15 and coupled with a reel 16 mounted from the drive shaft of a centrally mounted a.c. or reversible d.c. motor 17. The sheaves 11 and 13 mount respective keeper arms 21 and 23 which are selectively rotated to the projecting position shown in FIG. 1 to be received behind respective retainer brackets 27 and 29 to, in the event the door operator is actuated, engage the door frame to block opening.

For convenient manufacturing, shipping and installation it is important that the locking mechanism be constructed of a relatively few straightforward components which are convenient to install and afford positive locking characteristics. The attitude of the general public toward rather cumbersome or complicated appearing locking mechanisms which might be sold in kit form is such that the majority would be discouraged from purchasing, installing or using a locking mechanism which, in the first instance, appeared cumbersome or complicated. Consequently, the components of the present mechanism have been reduced to the very minimum and have been fabricated of relatively rugged construction so as to be convenient to install and to afford positive locking of the door 15 when in operation.

The garage door 15 is of a conventional one-piece construction and will typically be carried from the frame by means of overhead garage door hinges which mount such door from the respective frame posts 43 and 45. Such hinges are typically of a construction as to cause the path of the bottom of the door during opening to move generally outwardly and upwardly relative to the door frame.

The sheaves 11 and 13 may be constructed of metal or hard plastic and are mounted on respective mounting plates 31 and 33 affixed to the opposite sides of the door 15. The sheaves 11 and 13 are of a wheel shape and are formed with circumferential grooves 34 for training therein of respective endless wire ropes 35 and 37 which are also trained over the reel 16 (FIGS. 2 and 4) as discussed hereinafter.

Figure 4:
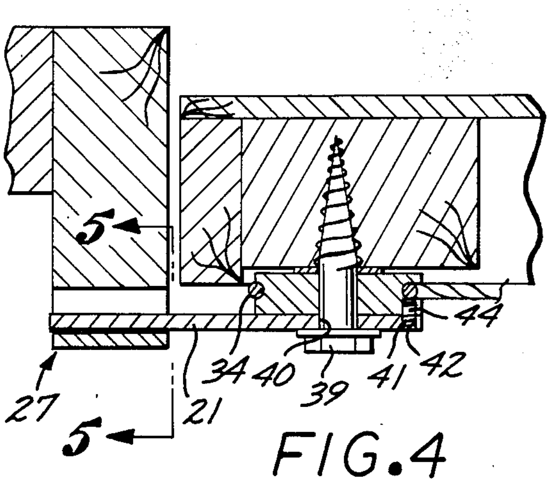
FIG. 4 is a horizontal sectional view, in enlarged scale, taken along the line 4—4 of FIG. 1.

The sheaves 11 and 13 are mounted to the mounting plates 31 and 33 by means of respective axle bolts 39 which are received through bores 40 formed adjacent the respective one ends of the respective keeper arms 21 and 23 (FIG. 4). The keeper arms 21 and 23 are fixed against rotation by respective Allen screws 41 which pass through bores 42 formed in the ends of such arms 23 and are threadably received within threaded bores 44 formed in the respective sheaves 11 and 13 (FIG. 4). As shown in FIG. 4, the interior ends of the Allen screws 41 abut the respective wire ropes 35 and 37 to hold them captive in the respective sheaves.

Referring to FIG. 1, couplers 85 and 87 are provided for coupling the opposite ends of the ropes 35 and 37 together.

Mounted on the vertical posts 43 and 45 defining the opposite sides of the frame for the door 15 are the respective retainer brackets 27 and 29. Referring to FIGS. 3 and 4, the retainer brackets 27 and 29 are formed on the bottom ends with mounting flanges 49 which overlie the face of the respective frame posts 43 and 45. The brackets 49 then turn outwardly to form a horizontally extending leg 51 (FIG. 5) and then turn upwardly to form respective retainer flanges 53 behind which are received the respective keeper arms 21 and 23.

Referring to FIGS. 1 and 2, the motor 17 can be easily mounted from the door 15 by means of a mounting flange 57 and has the reel 16 mounted from the drive shaft 59. The reel 16 is conveniently hat shaped to form a cylindrical recess 61 and is formed centrally with a bore 63 for receipt of the shaft 59. The reel 16 is formed in its periphery with a pair of side by side grooves 65 and 67 through which the respective wire ropes 35 and 37 are trained. The respective ropes 35 and 37 are held captive against slippage in the grooves 65 and 67, respectively, by means of Allen screws 68 and 70 (FIG. 1).

Referring to FIGS. 1 and 3, mounted from the door frame adjacent the right hand retainer bracket 29 is a limit switch 71 having the arm 73 thereof disposed in the path of the keeper arm 23 as it is rotatively lowered into its locking position as shown. Similarly, mounted above the sheave mounting bracket 33 is a second limit switch 75 which has its actuator 77 located in the path of such keeper arm 23 as it is rotated to its vertically projecting retracted position. Referring to FIG. 1, mounted on the door frame above the door itself is a third limit switch 79 having its arm disposed in the path of the top of the door 15 to thus be actuated when the door is closed to initiate operation of the motor 17.

The limit switches 71, 75, and 79 are connected in circuit with the garage door opener (not shown) through a controller 91 (FIG. 1). The opener can be rendered operative by remote control only during a predetermined period, e.g. three seconds, after the keeper arm 23 contacts switch 75. The switch 75 is connected in circuit with a one-shot 82 and AND-gate 84 (FIG. 6) which provides a window of e.g. three seconds within which the garage door opener may be rendered operative after the keeper arm 23 reaches its fully retracted or unlocked position. If the operator transmitter or switch is not actuated within that three second interval the operator will not be actuated until the switch 75 is opened and closed again.

Figure 5:
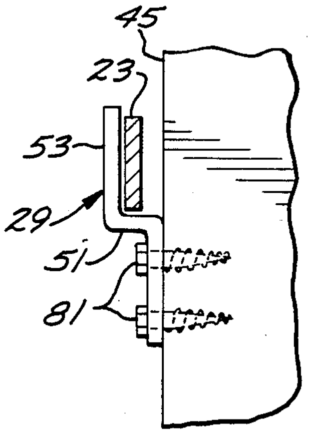
FIG. 5 is a transverse sectional view taken along the line 5—5 of FIG. 4.

In operation, it will be appreciated that the components of the locking mechanism of the present invention will typically be marketed in kit form and the homeowner himself may easily install the mechanism on a garage door 15 with only a minimum degree of dexterity and skill. The user can easily mount the mounting plates 31 and 33 on the opposite sides of the door and mount the respective sheaves 11 and 13 thereon with the keeper arms 21 and 23 fixed in place relative to the sheaves. The retainer brackets 27 and 29 may then be aligned with the keeper arms 21 and 23 and secured in position by means of mounting screws 81 (FIG. 5). The motor mounting bracket 57 may then be mounted at a location centrally between the sheaves 11 and 13.

The wire ropes 35 and 37 may then be threaded in the respective grooves 65 and 67 on the reel 16 and through the respective grooves of the sheaves 11 and 13 and such ropes cut to length. The ends of the ropes may then be secured together by means of the respective couplers 85 and 87 (FIG. 1). The limit switches 71, 75 and 79 may then be mounted in position and the switch 79 may be wired in circuit with the motor 17 and garage door operator circuit (not shown). The limit switches 71 and 75 may then be wired in circuit with the motor 17 and the motor itself wired with a control box 91 (FIG. 1) mounted at the upper right hand side of the door frame. The controller 91 incorporates a receiver 142 for actuation by a transmitter carried in the automobile to thus remotely actuate the motor 17 for opening of the locking mechanism prior to actuation of the garage door opener (not shown).

It will be appreciated that the retainer brackets 27 and 29 are designed for use with a one-piece overhead garage door but that brackets of slightly different construction may be utilized with sectional garage doors which travel upwardly on tracks located at the opposite sides of the door frame. Such brackets might be just the reverse of the brackets 47 and 49 such that they will block upward travel of the keepers 21 and 23 when such keepers are in a locking position but will permit the keepers to be rotated downwardly and outwardly therefrom to a downwardly directed retracted position.

With the locking mechanism so installed, when the driver is approaching the garage door and wishes to actuate his locking mechanism, a remote control transmitter 146 (FIG. 6) may be actuated to energize the receiver within the controller 91 by remote control. Motor 17 is thus actuated and drives the reel 16 in a clockwise direction as viewed in FIG. 1 to thus rotate the sheave 11 in a clockwise direction and the sheave 13 in a counterclockwise direction thereby raising the arms 21 and 23 to their vertically oriented position. As the arms 21 and 23 reach their vertical position the arm 23 will engage the arm 77 of the limit switch 75 to thus de-energize the motor 17 and arm the garage door opener circuitry for operation upon receipt of the transmitter signal. This condition will exist for three seconds. When the garage door opener is then energized, the door 15 will be opened.

When the door 15 is subsequently closed the top edge thereof will engage the arm of the limit switch 79 thereby closing the limit switch and energizing the motor 17, causing the reel 16 to rotate in a counterclockwise direction thus rotating the sheave ll counterclockwise and the sheave 13 clockwise to thereby drive the keeper arms 21 and 23 outwardly and downwardly to their extended positions. As the arm 23 is rotated clockwise as viewed in FIG. 3 it will reach its horizontal position engaging the arm 73 of the switch 71 to thereby deactivate the circuit of the motor 17. Thereafter, should an unauthorized individual endeavor to open the garage door 15 by applying force thereto it will be appreciated that opening of such garage door will be positively resisted by the fact that efforts to swing the bottom of the garage door outwardly in a path dictated by the mounting hinges (not shown) will result in the respective keeper arms 21 and 23 engaging the faces of the frame posts 43 and 45 (FIGS. 1 and 5) which act as stops against opening. It will be appreciated that because of the short length of the arms 21 and 23 and the fact that the brackets 27 and 29 are located immediately adjacent the edges of the doors, the stresses applied to such arms 21 and 23 are essentially shear forces. Consequently, the arms 21 and 23 can withstand high magnitudes of opening forces, probably in excess of what could be withstood by the door 15. Such resistance to opening will normally discourage even the most insistent burglar thus rendering the garage and contents thereof secure and safe whenever the locking mechanism is actuated.

Should the unauthorized intruder endeavor to force the bottom of the door 15 inwardly relatively to the door frame, such inward travel thereof will be resisted by the fact that the keeper arms 21 and 23 are engaged behind the stopper flanges 53 of the respective retainer brackets 27 and 29 thus resisting such inward travel of the door. The retainer brackets will also resist bending of the keeper arms 21 and 23 should an intruder endeavor to thrust a pry bar through on the opposite side of the door to engage such keeper arms and push them away from the door.

Figure 6:
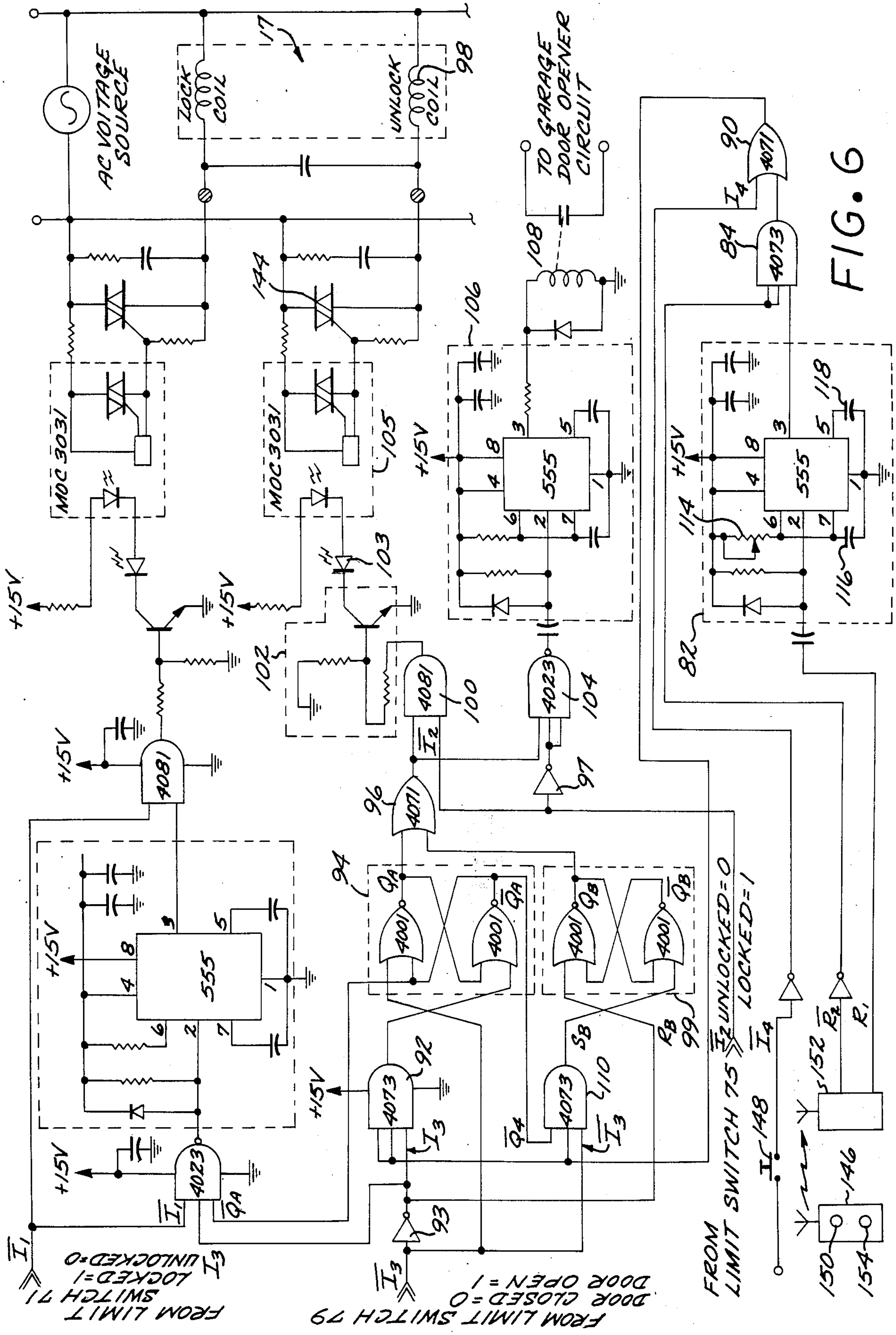
FIG. 6 is a circuit diagram of the controller.
Figure 8:
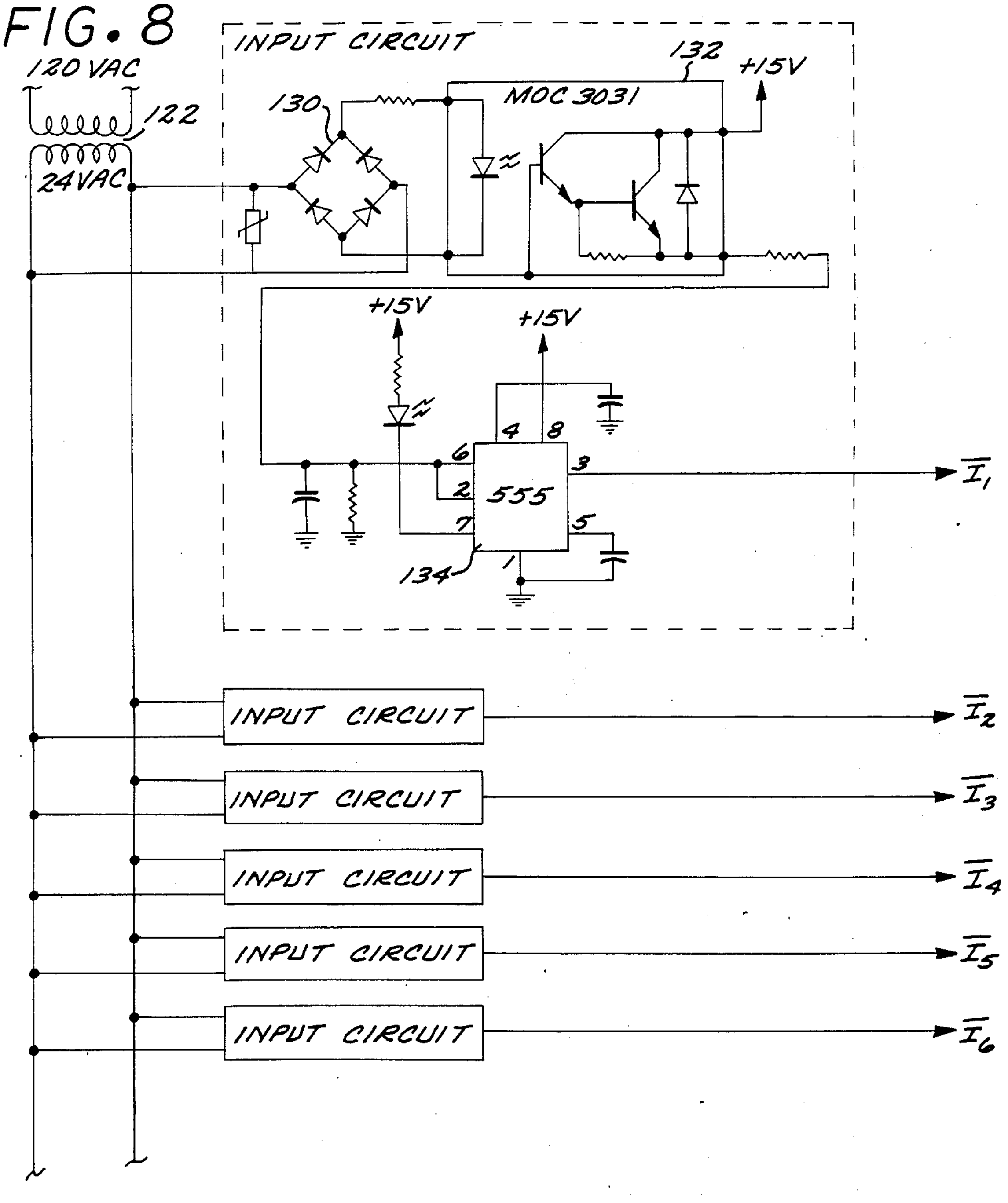
FIG. 8 is a circuit diagram of an input circuit for the controller.

The circuit diagram of the controller 91 is shown in FIG. 6. The controller 91 is connected in parallel between a voltage source and the motor 17 and controls the opening and locking of the garage door. Input lines $\bar{I}_1$–$\bar{I}_4$ interconnect a d.c. voltage source and the controller 91 as shown in FIG. 6 and FIG. 8. The input lines $\bar{I}_1$, $\bar{I}_2$ and $\bar{I}_3$ are connected to the limit switches 71, 75, and 79, respectively while $\bar{I}_4$ is connected to a push-button switch (not shown) for user activation of the controller.

The three limit or sensor switches 71, 75, and 79 provide an electrical signal to indicate the condition of the keeper arm (locked or unlocked) and the garage door (open or closed). When the keeper arm is fully locked, limit switch 71 which is connected to input line $\bar{I}_1$, generates a "low" voltage or a zero on $\bar{I}_1$. When the keeper arm is fully unlocked in its vertical position, limit switch 75 closes generating a low voltage and causing a low voltage on the input line $\bar{I}_2$ to which limit switch 75 is connected. Two separate limit switches are necessary to indicate either completely locked or completely unlocked, respectively, as the keeper arm may also be in between its locked and unlocked positions. When the garage door is open, limit switch 79 connected to input line $\bar{I}_3$, closes, presenting a low voltage on $\bar{I}_3$. When the door is open, limit switch 79 is open and $\bar{I}_3$ will have a "high" voltage or a one. (A high voltage is typically defined as 3.5 volts or greater while a low voltage is 0.3 volts or less.)

The controller 91 is activated by the user through an operator device which may be remote or manual. Manual control may be accomplished by the push button switch 148. When the push button manual switch 148 or the remote activating switch button 150 of the transmitter 146 is depressed by the user, the sequence to unlock and open the door commences, provided the keeper arm is in its locked state and the door is closed.

Pressing the manual push-button switch produces a high voltage control signal on line $\bar{I}_4$ which is one of the inputs to OR-gate 90. When $I_4$ is high, the output of OR-gate 90 will be high. The output of OR-gate 90 and the inverted input line $I_3$ are AND-ed by AND-gate 92. When the garage door is closed, $\bar{I}_3$ is low. $\bar{I}_3$ is inverted by inverter 93 prior to becoming input to AND-gate 92. Consequently, when the door is closed and the push-button is depressed, the output of AND-gate 92 will be high which sets an RS flip flop 94 whose output, QA, is then high and OR-ed (96) with the output QB of a second RS flip flop 99.

With continued reference to FIG. 6, if the garage door is locked, a high voltage will appear on input line $\bar{I}_2$. It will be appreciated that because the output of OR-gate 96 is AND-ed with $\bar{I}_2$, the output of AND-gate 100 will go high when the garage door is locked and the push-button is depressed. The output voltage of AND-gate 100 is amplified by transmitter circuit 102 to light zener diode 103. Transistor circuit 102 includes resistor 101 in parallel with resistor 109 connected to the base of transistor 111. The emitter of transistor 111 is connected to ground while the collector is connected to zener diode 103.

The lighting of zener diode 103 activates optical triac 105. Optical triacs may be purchased, for example, from Motorola as MOC 3031 and provide isolation from spurious noise. The optical triacs 105 and 107 act as a switch. When zener diodes 103 or 117 are lighted, the optical triac switch is closed, causing current to flow through triacs 114 and 113 and through the locking and unlocking coils of electric motor 17, respectively, which in turn causes the sheath and keeper arm to rotate, thereby unlocking the garage door. Resistors 119 and 121 and capacitors 125, 127, and 129 serve as filters to prevent interference from noise signals.

When the garage door begins to unlock and the keeper arm to rotate, limit switch 71 is released, causing $\bar{I}_1$ to go high. At approximately the same time, the operator hears the electric motor and releases either the push button or the remote control switch, causing $\bar{I}_4$ to go high. When $\bar{I}_4$ goes high, $I_4$ goes low and the output of OR-gate 90 goes low, causing the output to AND-gate 92 to go low resetting flip flop 94. When the keeper arm reaches its fully unlocked vertical position, it closes limit switch 75, causing $\bar{I}_2$ to go low. When $\bar{I}_2$ goes low, AND-gate 100 goes low thereby deactivating the unlocking coil 98 and stopping the electric motor.

With continued reference to FIG. 6, when the door is unlocked, $\bar{I}_2$ is low and $I_2$ is high (after being inverted by inverter 97) which causes NAND-gate 104 to go low. The low output of NAND-gate 104 is input to a negative-edge triggered one-shot 106. When the output of NAND-gate 104 goes low, a pulse will be triggered by the one-shot 106 to close the relay 108, thereby opening the door.

As the garage door begins opening, limit switch 79 is released, causing $\bar{I}_3$ to go high. When $\bar{I}_3$ goes high, the output of flip flop 94, QA, is low, resetting flip flop 94. When QA is low, the output of OR-gate 96 is caused to go low, which in turn causes NAND-gate 104 to go high.

The door opening causes $\bar{I}_3$ to be high and $\bar{I}_1$ is still in its high state as is $\overline{QA}$, representing the unlocked position of the keeper arm. Consequently, NAND-gate 132 generates a low output as a negative-edge trigger to one-shot 134. (Both one-shots 134 and 106 are configured with resistance and capacitance values as suggested in the manufacturer's data sheet.) One-shot 134 generates a pulse or temporarily high signal. Since $I_1$ is also high, AND-gate 136 is high, causing the current to flow through zener diode 117, as shown by the arrows in FIG. 6, which activates optical triac 107 as in the unlocking portion of the circuit.

In operation in order to close and lock the door, the push button is again pressed, causing $\bar{I}_4$ to go low. when $\bar{I}_4$ is low, $I_4$ is high causing the output of OR-gate 90 to be high. The high output of OR-gate 90 causes AND-gate 110 to go high, setting flip flop 99 and causing its output QB to go high. When QB is high, OR-gate 96 will be high. $\bar{I}_2$ is low because the keeper arm is in its unlocked position and $I_2$ will be high. Consequently, both inputs to NAND-gate 104 will be high, which is the one condition which will trigger the negative-edge triggered one-shot 106 to close the relay and begin closing the door. It will be appreciated that closing relay 108 will generate an opener control signal to activate the conventional garage door opener to open if the garage door is presently closed, or to close if the garage door is presently open.

The remote control input lines $\overline{R}_1$ and $\overline{R}_2$ are in electrical connection with the circuit of an actuator receiver 150. When the user presses the remote-control activating switch 150, a signal is transmitted at a first predetermined frequency for reception by the receiver 152. When the signal is received, it is decoded and a low voltage is presented on input line $\overline{R}_1$ (FIG. 6) which triggers one-shot 82 to produce a pulse of a predetermined width or time period. The predetermined time period or pulse width is set by the selection of resistor or potentiometer 114 and capacitors 116 and 118 as is known to those skilled in the art.

The remote transmitter 146 has two buttons 150 and 145 (FIG. 6). When the user activates the activator button 150, $\overline{R}_1$ is low, triggering one-shot 82. The user must then within a predetermined period of time press the opener button 154, which generates a low signal which, when inverted is a high signal, and acts as an input to AND-gate 84. It will be appreciated that $R_2$ and the output of one-shot 82 must both be high in order to produce a high output voltage from AND-gate 84. Consequently, an enabling signal will not be received from AND-gate 84 unless the user presses the second push button within the predetermined time period of the pulse produced by the one-shot 82. A person, such as a burglar, who is unfamiliar with the foregoing requirements, will not be aware that he must press the second remote control button within the predetermined time period in order to unlock and open the door.

Figure 7:
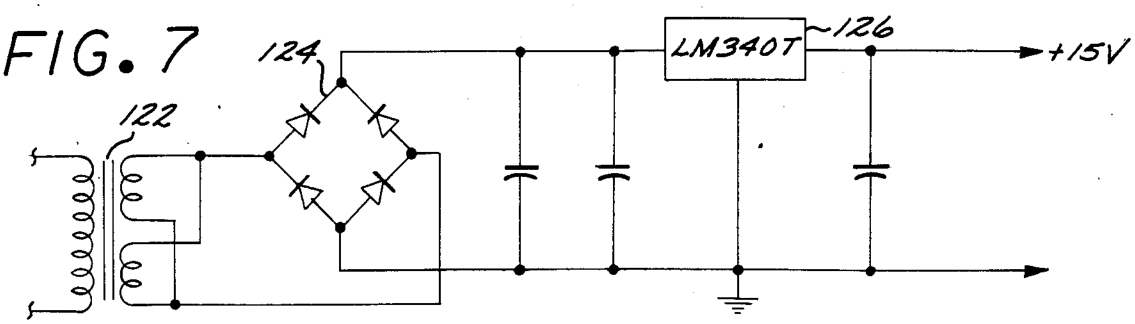
FIG. 7 is a circuit diagram of a power supply circuit.

Although the embodiment disclosed herein utilizes a.c. line voltage and consequently, an a.c. motor with separate locking and unlocking coils, a reversible d.c. motor may also be used with a d.c. power source and a single coil which is rotated clockwise or counterclockwise. FIG. 7 shows a typical circuit for providing a d.c. voltage from the alternating line voltage provided by electrical outlets available in most residences. The line voltage is stepped down to e.g. 24 volts a.c. from 120 volts a.c. by the transformer 122. The 24 volts a.c. is then rectified by the rectifier bridge 124. The output of the rectifier 124 is input to voltage regulator 140 which provides a constant output voltage despite fluctuation in its input voltage. Varistor 140 is a non-destructive protective element for the input circuit shown in FIG. 8. The varistor 140 increases its resistance as the voltage increases.

A typical input circuit for the controller 91 includes optically isolating the voltage on the input line $\bar{I}_1$ through $\bar{I}_6$ to prevent interference from spurious signals on the a.c. line voltage. The a.c. line voltage is stepped down by the transformer 122 and is electrically connected to push button switch 128. The output of the switch 128 is connected to rectifier 130. The output of the rectifier 130 serves as input to the optical triac 142. The output of the optical triac may be used to trigger the one-shot 134. The one-shot 134 is set for a time period which is greater than the time period of the rectified a.c. line voltage such that the one-shot is continuously being triggered creating a constant d.c. voltage on the output pin 3 of one-shot 134. It will be appreciated by those skilled in the art that there are a number of circuits which will convert the a.c. line voltage to a constant d.c. voltage.

From the foregoing it will be apparent that the garage door locking mechanism of the present invention, while being relatively inexpensive to fabricate, is convenient to install and provides a high degree of security against unauthorized intrusion.

Various modifications and changes may be made with regard to the foregoing description without departing from the spirit of the invention.

I claim:

1. A garage door locking apparatus for locking an overhead garage door in its locked position relative to a door frame mounting a track on which said door is retracted and comprising:
   - a sheave mounted on one side of said door adjacent one edge thereof, said sheave being rotatable in one direction from a locked to an unlocked position;
   - a keeper arm mounted in fixed position on said sheave for being rotated with said sheave as it is rotated from said locked position to said unlocked position to project beyond said edge of said door to overlie said frame and to, further, be carried by said sheave to a retracted position clear of said frame when said sheave is rotated to said unlocked position, said keeper arm being, when in said unlocked position, carried through a predetermined path as said door is moved from its closed position toward its open position;
   - a stop on said frame disposed in said predetermined path;
   - a reel for rotation from a first to a second position;
   - an electric motor mounted on said door and coupled with said reel for rotating said reel between said first and second positions;
   - connector means connecting said reel to said sheave and operative upon rotation of said reel from said first to said second position to rotate said sheave from said locked to said unlocked position; and control means for controlling operation of said motor whereby said motor may be actuated to rotate said reel from said first to said second position to rotate said sheave to said unlocked position thus freeing said door for opening.

2. A garage door locking apparatus according to claim 1 wherein:

said connector means is in the form of a steel rope.

3. A garage door locking apparatus according to claim 1 that includes:

a retainer bracket formed with a mounting flange mounted on a face of said frame, said bracket turning outwardly away from said frame and then turning to project coextensive with, but spaced from, said face of said frame to form a retaining flange cooperating with said face of said frame to form a passage for receipt of said keeper arm.

4. A garage door locking apparatus according to claim 1 wherein:

said motor is reversible and includes a drive shaft mounting on said reel; and said connector means includes a wire rope connected on one end to said reel, trained over said sheave and connected to said reel.

5. A garage door locking apparatus according to claim 1 for use with an automatic garage door opening and that includes:

garage door opener circuit means including a limit switch having an actuator placed in the path of said keeper arm as it is rotated fully to said unlocked position to be engaged thereby to actuate said circuit means.

6. A garage door locking apparatus according to claim 1 wherein:

said motor is mounted centrally on said door and said apparatus includes a second sheave mounted on the edge of said door opposite said one side;

a second keeper arm on said second sheave and rotatable therewith from a projecting position projecting beyond the edge of said door and overlying said frame to, when in said unlocked position, be carried by said door through a predetermined path as said door is moved from its closed toward its open position;

a second stop on said frame disposed in said predetermined path and wherein;

said connector means connects said second sheave with said reel for rotation of said second keeper arm from said unlocked position to a retracted position clear of said predetermined path as said reel is rotated from said first to said second position.

7. A garage door locking apparatus according to claim 1 that includes:

a retainer bracket mounted on said frame for receipt of said keeper arm when in said projecting position to retain said keeper arm against movement away from said frame.

8. A garage door locking apparatus for locking and unlocking an overhead garage door relative to a door frame and for controlling an electric garage door opener, said apparatus comprising:

a keeper arm for mounting on said door to selectively project to a locked position relative to said door frame and to an unlocked position clear of said frame;

electric motor means responsive to first and second motor drive signals to rotate its drive shaft in respective locked and unlocked directions;

coupling means coupled between said keeper arm and said drive shaft of said electric motor and operative upon rotation of said drive shaft in said locked and unlocked directions to urge said keeper arm to respective locked and unlocked positions;

an operator for generating a control signal;

first and second sensor switches mounted in the path of said keeper arm to be contacted upon said keeper arm reaching its respective locked and unlocked positions to generate respective locked and unlocked signals; and gating means in electrical connection with said operator, motor means and first and second sensor switches and including first gating means operative in response to said control signal and said unlocked signals to generate said first motor drive signal and second gating means operative in response to said control signal and said locked signals to generate said second motor drive signal and third gating means operative in response to said control signal and said unlocked signals to generate an opener control signal for controlling said electric garage door opener whereby said locking apparatus is operative to unlock said door only when said keeper arm is in said locked position and operative to lock said door only when said keeper arm is in said unlocked position.

9. A security control system for selectively rendering an operator operative and comprising:

remote transmitting means having first and second switches for sequential actuation to selectively transmit respective first and second transmitter signals having a predetermined frequency;

receiving and decoding means for sequentially receiving and decoding said first and second transmitter signals, to sequentially generate respective first and second actuating signals, said receiving and decoding means operative to decode only said predetermined frequency;

time limit means responsive to said first actuating signal for generating a pulse for a predeterminec time period; and gating means, connected to said time limit means and operative in response to said pulse and said second actuating signal to render said operator operative whereby said operator is rendered operative only if said second switch is actuated within said predetermined time period after said first switch is actuated.

* * * * *